(12) United States Patent
Goswami

(10) Patent No.: US 8,224,641 B2
(45) Date of Patent: Jul. 17, 2012

(54) LANGUAGE IDENTIFICATION FOR DOCUMENTS CONTAINING MULTIPLE LANGUAGES

(75) Inventor: Sauraj Goswami, Palo Alto, CA (US)

(73) Assignee: Stratify, Inc., Mountain View, CA (US)

( * ) Notice: Subject to any disclaimer, the term of this patent is extended or adjusted under 35 U.S.C. 154(b) by 905 days.

(21) Appl. No.: 12/274,182

(22) Filed: Nov. 19, 2008

(65) Prior Publication Data

US 2010/0125447 A1 May 20, 2010

(51) Int. Cl.
*G06F 17/20* (2006.01)

(52) U.S. Cl. .................. 704/8; 704/1; 704/2; 704/9

(58) Field of Classification Search .................. 704/8, 1, 704/2, 9
See application file for complete search history.

(56) References Cited

U.S. PATENT DOCUMENTS

| | | | |
|---|---|---|---|
| 6,002,998 A | 12/1999 | Martino et al. | |
| 6,047,251 A | 4/2000 | Pon et al. | |
| 6,064,767 A | 5/2000 | Muir et al. | |
| 6,157,905 A | 12/2000 | Powell | |
| 6,167,369 A | 12/2000 | Schulze | |
| 6,182,099 B1 | 1/2001 | Nakasato | |
| 6,272,456 B1 | 8/2001 | de Campos | |
| 6,292,772 B1* | 9/2001 | Kantrowitz | 704/9 |
| 6,519,557 B1 | 2/2003 | Emens et al. | |
| 7,295,962 B2* | 11/2007 | Marcu | 704/2 |
| 2001/0056348 A1 | 12/2001 | Hyde-Thomson et al. | |
| 2002/0184003 A1 | 12/2002 | Hakkinen et al. | |
| 2003/0069909 A1 | 4/2003 | Bellegarda | |
| 2004/0006457 A1 | 1/2004 | Dehlinger et al. | |
| 2004/0006467 A1 | 1/2004 | Anisimiovich et al. | |
| 2004/0039563 A1 | 2/2004 | Suzuki | |
| 2004/0078191 A1 | 4/2004 | Tian et al. | |
| 2005/0154578 A1 | 7/2005 | Tong et al. | |
| 2005/0268233 A1 | 12/2005 | Perla et al. | |
| 2006/0184357 A1 | 8/2006 | Ramsey et al. | |
| 2006/0229865 A1* | 10/2006 | Carlgren et al. | 704/8 |
| 2007/0124132 A1 | 5/2007 | Takeuchi | |
| 2008/0147380 A1 | 6/2008 | Barliga et al. | |
| 2010/0082349 A1* | 4/2010 | Bellegarda et al. | 704/260 |

OTHER PUBLICATIONS

Nandakumar et al., "Likelihood Ratio Based Biometric Score Fusion," IEEE Trans. Pattern Analysis & Machine Intelligence, vol. 30, No. 2, (Feb. 2008), pp. 342-347.

* cited by examiner

*Primary Examiner* — Qi Han

(57) ABSTRACT

Multiple nonoverlapping languages within a single document can be identified. In one embodiment, for each of a set of candidate languages, a set of non-overlapping languages is defined. The document is analyzed under the hypothesis that the whole document is in one language and that part of the document is in one language while the rest is in a different, non-overlapping language. Language(s) of the document are identified based on comparing these competing hypotheses across a number of language pairs. In another embodiment, transitions between non-overlapping character sets are used to segment a document, and each segment is scored separately for a subset of candidate languages. Language(s) of the document are identified based on the segment scores.

30 Claims, 8 Drawing Sheets

LANGUAGE IDENTIFICATION FOR DOCUMENTS CONTAINING MULTIPLE LANGUAGES

BACKGROUND OF THE INVENTION

The present invention relates in general to automated language identification techniques and in particular to language identification techniques for documents that include portions in multiple languages.

With the proliferation of computing devices and communication networks such as the Internet, an ever increasing amount of information is stored in the form of electronic documents. Such documents might be generated using application software such as word processing programs, e-mail programs, web page development tools, etc. Electronic documents can also be generated by scanning paper documents and employing optical character recognition ("OCR") or other techniques to create an electronic representation of the content.

It is often necessary to search through a large collection of electronic documents to find information relevant to a particular question. For example, a number of search services provide interfaces via which users can search electronic documents that are accessible via the World Wide Web. In another context, discovery in civil litigation usually involves the production of massive quantities of electronic documents that the receiving party must sift through.

Electronic documents can exist in any human language, and search processes are greatly facilitated if the language of a document is known. For example, in the case of Asian languages, parsing the document into words is non-trivial as most Asian languages do not include a space character between words. Thus, it is helpful to determine which language such documents are in so that they can be correctly parsed into words. As another example, a character string or word might have different meanings in different languages, and search results are generally improved if the language of the documents is known.

A number of automated techniques have been developed to identify the language of a document. Many of these techniques fall into two categories: dictionary-based and n-gram based. In dictionary-based language identification, a "dictionary" is assembled for each of a number of candidate languages, often by analyzing training documents known to be in that language. The document is parsed into "words" (e.g., based on word-break indicators such as space characters and/or punctuation characters), and a frequency analysis is performed on the words to develop a frequency profile for the language. The dictionary for each language can be limited to a relatively small number of commonly occurring words (often short words, e.g., 5 characters or fewer) in that language. The language of an unknown document is determined by parsing the unknown document into words and determining a frequency profile for the unknown document. This frequency profile is compared to the profiles of the candidate languages, and the language with the best match is the language of the document. Dictionary-based techniques can work well for western languages but often fail with Asian languages, since the documents cannot be reliably parsed into words until the language is known.

In n-gram based language identification, the document is parsed into n-character units for some integer n, rather than into words. Typically, n is chosen to be a small number such as 2 or 3, and the n-grams overlap; thus, for example, the word "patent" can be parsed into bigrams (i.e., n-grams with n=2) as "_p", "pa", "at", "te", "en", "nt", "t_", where "_" denotes the space character. Using a set of training documents in each candidate language, an n-gram frequency profile can be developed for each candidate language. The language of an unknown document can be determined by analyzing the frequency of n-grams and comparing to the frequency profiles of the candidate languages. Using n-grams, particularly bigrams, can significantly reduce the size of the language model, as there are typically fewer possible bigrams than words in a given language. In addition, n-gram analysis does not require prior knowledge of where the word boundaries are, making it particularly suitable for analyzing Asian languages.

Both techniques have usually assumed that the unknown document is in a single language. In reality, some documents are in multiple languages. For example, owner's manuals or instructions for many products are often printed in multiple languages; a contract between entities in different countries might be drafted in two languages, and so on.

Some efforts have been made to adapt the techniques to identify languages for multi-lingual documents. For example, the document can be divided into arbitrary units, e.g., paragraphs, and each paragraph can be analyzed separately. Another approach involves applying the well-known Viterbi algorithm (or a similar algorithm) to find the most probable combination of languages given the text of the document.

BRIEF SUMMARY OF THE INVENTION

Existing techniques for multiple language identification have been less than satisfactory. For instance, analyzing arbitrary units separately can reduce the overall accuracy of language identification. The language identification is based on statistical profiling, and as the length of the samples profiled is reduced, the likelihood of error increases. Techniques based on the Viterbi algorithm are more robust but computationally expensive.

Accordingly, the present invention provides techniques for identifying multiple languages used within a document using n-gram techniques. In some embodiments, languages for a document are identified from a set of candidate languages. For each language (M) in the set of candidate languages, a set of non overlapping languages (N(M)) is defined such that the set N(M) consists of one or more languages (L) that do not overlap with the language M. As used herein, "overlap" of languages can be defined based on, e.g., whether the languages have any characters in common or whether the languages have any n-grams in common. To analyze a target document, n gram data for the target document is obtained. For each language M in the set of candidate languages, a final score $S_F(M)$ based on relative probabilities of a first hypothesis that the target document is entirely in the language M and a second hypothesis that one portion of the target document is in the language M while another portion of the target document is in a language L selected from the set N(M). Based on the final scores $S_F(M)$ for different languages M, one or more of the candidate languages are identified as being languages of the document. For example, the language $M_0$ with the best final score $S_F(M)$ of any candidate language M can be identified as a primary language of the document, and if a language $L_0$ contributed to the final score $S_F(M_0)$ for language $M_0$, then $L_0$ can be identified as a secondary language of the document.

In other embodiments, the set of candidate languages is divided into a plurality of disjoint subsets, where any two languages that are in different disjoint subsets do not overlap with each other. A document is segmented into one or more segments (t) of consecutive characters, where each segment t contains n grams that have greater than a default probability of occurrence only for languages in an active one of the disjoint subsets. For each segment t, a segment score ($S_t(L)$) is generated for each language L in the active one of the disjoint subsets. Based on segment scores $S_t(L)$ for all segments t and languages L, one or more languages are identified as being languages of the document. For example, in some embodiments, for each segment t, the language $L_t$ with the best segment score $S_t(L)$ can be identified as a language of the document. In some embodiments, scores for short segments that have the same active one of the disjoint language subsets can be combined to provide an aggregate score, and one or more languages of the document can be identified based on the aggregate scores.

The following detailed description together with the accompanying drawings will provide a better understanding of the nature and advantages of the present invention.

DETAILED DESCRIPTION OF THE INVENTION

Embodiments of the present invention provide methods and systems usable to identify the languages that appear in a multi-lingual document in instances where the languages use non-overlapping character sets according to a standard character coding scheme.

In one embodiment, languages for a document are identified from a set of candidate languages. For each language (M) in the set of candidate languages, a set of non overlapping languages (N(M)) is defined such that the set N(M) consists of one or more languages (L) that do not overlap with the language M. As used herein, "overlap" of languages can be defined based on, e.g., whether the languages have any characters in common or whether the languages have any n-grams in common. To analyze a target document, n gram data for the target document is obtained. For each language M in the set of candidate languages, a final score $S_F(M)$ based on relative probabilities of a first hypothesis that the target document is entirely in the language M and a second hypothesis that one portion of the target document is in the language M while another portion of the target document is in a language L selected from the set N(M). Based on the final scores $S_F(M)$ for different languages M, one or more of the candidate languages are identified as being languages of the document. For example, the language $M_0$ with the best final score $S_F(M)$ of any candidate language M can be identified as a primary language of the document, and if a language $L_0$ contributed to the final score $S_F(M_0)$ for language $M_0$, then $L_0$ can be identified as a secondary language of the document.

In another embodiment, the set of candidate languages is divided into a plurality of disjoint subsets, where any two languages that are in different disjoint subsets do not overlap with each other. A document is segmented into one or more segments (t) of consecutive characters, where each segment t contains n grams that have greater than a default probability of occurrence only for languages in an active one of the disjoint subsets. For each segment t, a segment score ($S_t(L)$) is generated for each language L in the active one of the disjoint subsets. Based on segment scores $S_t(L)$ for all segments t and languages L, one or more languages are identified as being languages of the document. For example, in some embodiments, for each segment t, the language $L_t$ with the best segment score $S_t(L)$ can be identified as a language of the document. In some embodiments, scores for short segments that have the same active one of the disjoint language subsets can be combined to provide an aggregate score, and one or more languages of the document can be identified based on the aggregate scores.

System Overview

Figure 1:
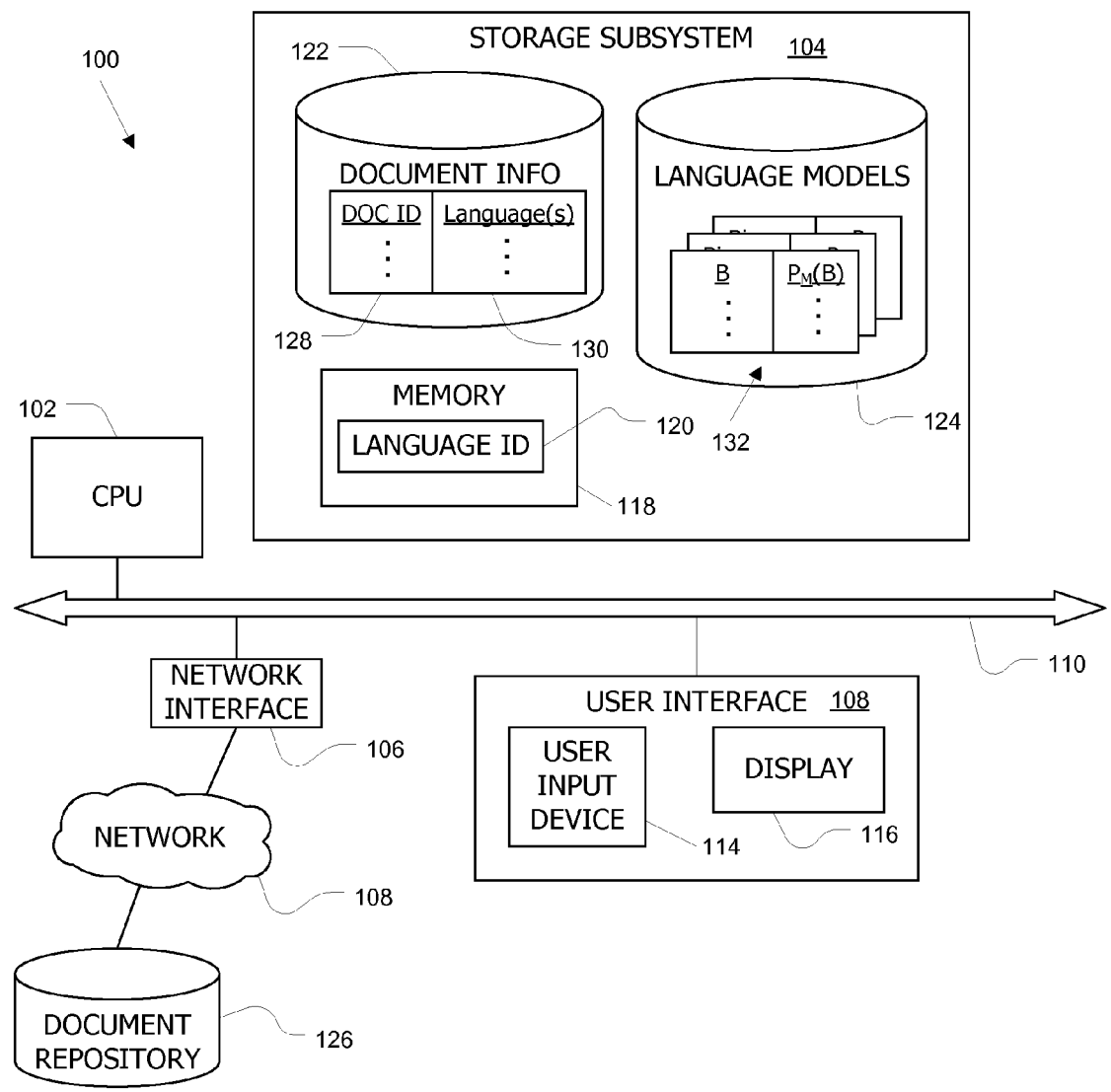
FIG. 1 is a block diagram of a computer system according to an embodiment of the present invention.

FIG. 1 is a block diagram of a computer system 100 according to an embodiment of the present invention. Computer system 100 includes a CPU 102, storage subsystem 104, network interface 106, and user interface 108 connected via a bus 110. CPU 102 can be, e.g., any programmable general-purpose processor. Network interface 106 provides access to one or more other computer systems via a network 112, which can include, e.g., a local area network (LAN), wide area network (WAN), the Internet (a globally interconnected network of computer networks), virtual private network, and so on. Network interface 106 can be implemented using standard protocols, including wired protocols (e.g., Ethernet) and/or wireless protocols (e.g., any IEEE 802.11 protocol). User interface 108 can include one or more standard input devices 114 such as a keyboard, mouse, touch screen, touch pad, etc., and one or more standard output devices such as a display 116. Bus 110 can be implemented using conventional bus architectures and may include bridges, bus controllers, and the like.

Storage subsystem 104 provides storage for programs and data accessed by CPU 102 and/or other components of computer system 100. In the embodiment shown, storage subsystem 104 includes primary memory 118. Primary memory 118 provides the fastest access times and can be implemented using known memory technologies such as DRAM (dynamic random access memory) and/or SRAM (static random access memory). Primary memory 118 is advantageously used at any given time to store programs and/or data that are actively in use by CPU 102. Thus, for example, memory 118 is shown as storing a language identification program 120 that, when executed, can cause CPU 102 to perform language identification operations as described below.

Storage subsystem 104 in this embodiment also provides secondary storage areas, which can include, e.g., magnetic media such as conventional hard or floppy disks, optical media such as compact disc (CD), digital versatile disc (DVD), or the like, and/or semiconductor media such as flash memory. Secondary storage areas generally have longer access time than primary memory 118 but have larger storage capacity. In this example, secondary storage areas are provided for a document information database 122 and a language model database 124.

Document information database 122 provides information (also referred to as metadata) about a corpus of documents. As used herein, a corpus of documents can be any collection of documents about which information is to be provided to a user of system 100. In one embodiment, the corpus of documents (or a portion thereof) can be stored in a document repository 126 that is remote from computer system 100 and accessible via network interface 106 and network 112. In another embodiment, the corpus (or a portion thereof) can be stored locally. The corpus can be centralized or distributed (e.g., it can be a collection of web documents that are stored on respective web servers connected to network 112 as is known in the art) as desired, and document information database 122 might or might not contain the actual documents.

Document information database 122 advantageously contains identifying information (Doc ID 128) for each document in the corpus. This information can include, e.g., a unique reference to a location where the document is stored. Associated with each document is language information 130 indicating the languages associated with the document. In accordance with an embodiment of the present invention, language information 130 can be populated by executing language identification program 120 on CPU 102. Document information database 122 can also include any other information about the document, such as dates of creation, editing, and/or addition to the corpus; type of document (e.g., e-mail, web page, word processor document); author; source or location from which the document was obtained; a condensed representation of document content in a readily searchable form; keywords; categorization information; and so on.

Language model database 124 in this embodiment provides a bigram model 132 for each of some number of candidate languages. Bigram model 132 for a given language (M) identifies some (or all) of the bigrams B that occur in that language, and for each bigram B, an associated probability $P_M(B)$ of bigram B occurring in language M. In one embodiment, if bigram B is made up of characters $b_1 b_2$, then probability $P_M(B)$ is defined as the conditional probability that, in language M, the character following $b_1$ is $b_2$ as opposed to some other character. That is, $P_M(B) = P_M(b_2|b_1)$. The language model may also include a single-character probability $P_M(b_i)$ for each possible character $b_i$ in language M. The language model for language M may be developed, e.g., by analyzing a large number (e.g., several thousand) of "training" documents that are known in advance to be entirely written in language M. The data extracted from the training documents can be used to define the probabilities $P_M(B)$ for particular bigrams B and to determine which bigrams B occur in language M with sufficient frequency to be useful for language identification. In some embodiment, the language model includes bigram probability information for only a subset of bigrams B that occur in the language. Models can be provided for any number of languages.

In one embodiment, each possible character is represented using a standard character code scheme such as the well known 16-bit Unicode Transformation Format (UTF-16) encoding, and each possible bigram is represented as a pair of characters in the standard character code scheme. In one embodiment, bigram data for a candidate language is stored as an array or lookup table indexed by the pair of codes representing the bigram in the standard character coding scheme; each entry provides the probability of the bigram occurring in the candidate language. Lookups for the same bigram can be carried out in parallel on arrays or lookup tables corresponding to different candidate languages. In another embodiment, the bigram probability for a given bigram across all candidate languages can be stored as a vector with each component representing the probability of occurrence of that bigram in one of the candidate languages. Storing the bigram probability as a vector, while not required, allows the probability of a particular bigram to be looked up in parallel for all candidate languages. Similarly, the single-character probability for a given character across all candidate languages can also be stored as a vector to facilitate faster lookup.

It will be appreciated that computer system 100 is illustrative and that variations and modifications are possible. For example, although storage subsystem 104 is shown as local to system 100, in alternative embodiments, all or part of storage subsystem 104 can be implemented as remote storage, e.g., on a storage area network (SAN) or other remote server accessible via network 112. Thus, for example, document information database 122 and/or language model database 124 can be stored locally or remotely as desired. Further, although a language identification program is shown as residing in primary memory 118, the invention is not limited to any particular mechanism for supplying program instructions for execution by CPU 102. For instance, at any given time some or all of the program instructions for language identification program 120 may be present within CPU 120 (e.g., in an on chip instruction cache and/or various buffers and registers), in a page file or memory mapped file on a system disk, and/or in other local or remote storage space. In some embodiments, computer system 100 might be implemented as a server accessible to a user via a network, and user interface 108 is optional. Computer system 100 may also include additional components such as floppy disk drives, optical media drives (e.g., CD or DVD), network interface components, USB interface, and the like. Computer system 100 can be configured with many different hardware components and can be made in many dimensions and styles (e.g., laptop, tablet, server, workstation, mainframe); network connections may be provided via any suitable transport media (e.g., wired, optical, and/or wireless media) and any suitable communication protocol (e.g., TCP/IP). A particular computer architecture or platform is not critical to the present invention.

Overview of Bigram-Based Language Analysis

Embodiments described herein use a bigram-based language analysis technique. As noted above, in a bigram-based language model, each character $c_i$ has a probability $P_M(c_i)$ of occurring and a bigram B made up of consecutive characters $c_i c_{i+1}$ has a conditional probability $P_M(B) = PM(c_{i+1}|c_i)$ of occurring. Thus, if the content of a document D is represented as a character string $c_0 c_1 c_2 \ldots c_{n-1}$, where n is the number of characters in document D, then the probability that document D is in language M can be defined as:

$$P_M(D) = P_M(c_0) * \prod_{i=1}^{n-1} P_M(c_i | c_{i-1}). \tag{1}$$

The language model M that yields the highest probability $P_M(D)$ can be identified as the most likely language of the document.

An alternative technique uses the logarithm of the reciprocal of Eq. (1) to define a score for the document. Thus, the score $S_M(D)$ for document D under language model M can be defined as:

$$S_M(D) = \log\left[\frac{1}{P_M(c_0)}\right] + \sum_{i=1}^{n-1} \log\left[\frac{1}{P_M(c_i | c_{i-1})}\right]. \quad (2)$$

Any convenient base, e.g., base 2 or base 10, can be used for the logarithm. The score $S_M(D)$ decreases with increasing probability $P_M(D)$, so the language with the lowest score $S_M(D)$ can be identified as the most likely language of the document. Assuming the same probabilities are used, Eq. (2) yields the same outcomes as Eq. (1) (i.e., under either scoring model, the same language would have the best score for document D) but is computationally faster for existing computer systems, as it replaces the multiplications of Eq. (1) with additions. Eq. (2) also avoids underflow problems that can occur when numbers less than 1 are multiplied. In some implementations, the bigram language models in database 124 of FIG. 1 can store the logarithm of the reciprocal of the probability of a bigram (i.e., log [1/P] for probability P) rather than the probability itself, allowing Eq. (2) to be computed using only lookup and addition operations.

It should be noted that certain bigrams have zero probability of occurrence in some languages. For instance bigram "qx" does not occur in English; likewise, bigrams made up of Japanese or Chinese characters do not occur in English. In Eq. (2), a zero in the denominator would cause problems. In addition, as described above, the language model for a particular language might not include all possible bigrams for that language. Accordingly, it can be useful to define a default probability (e.g., $P_M(\text{Default})=2^{-15}$) and assign this default probability to any bigram having a lower probability of occurring or to any bigram not represented in the language model. (Bigrams with the default probability are referred to herein as "default bigrams.") The same default probability is advantageously used for each language model. In one embodiment, default bigrams are not represented in the language models; if a lookup for bigram B in the model for language M fails, it is inferred that $P_M(B)$ is the default probability.

Regardless of whether Eq. (1) or Eq. (2) is used for scoring, it can be useful to apply a threshold such that if the most probable language is insufficiently probable, the document is identified as having no language. This will reduce false positives. In the case of Eq. (1), the threshold will be a minimum value; in the case of Eq. (2), a maximum value. The threshold is advantageously defined as a function of the number of characters (or bigrams) in the document. For example, using Eq. (2), a normalized score $\hat{S}_M(D)$ can be defined as:

$$\hat{S}_M(D) = S_M(D)/n, \quad (3)$$

where n is the number of characters in document D. Using a set of training documents known to be in language M, a mean normalized score $\mu_M$ and standard deviation $\sigma_M$ across the training set can be determined, and the threshold can be defined as:

$$T_M = \mu_M + k\sigma_M. \quad (4)$$

The parameter k can be adjusted to optimize the balance between false positives (i.e., instances where a document not actually in the most probable language M is mistakenly identified as being in M) and false negatives (i.e., instances where a document actually in the most probable language M is mistakenly identified as not being in any language) as desired; usually a value of 3 or above is desirable.

The above analysis technique is based on the assumption that a document is in a single language. Embodiments of the present invention do not make this assumption. Instead, default bigrams are detected and treated as an indication that a portion of the document may be in a different language. In particular, default bigrams for a particular language $M_\alpha$ will always occur when the bigrams correspond to a portion of a document that is in a different language $M_\beta$ whose character set does not overlap with that of language $M_\alpha$. Thus, the analysis is modified when default bigrams in a first candidate language are detected, to determine whether the portion of the document containing such bigrams is likely to be in another language that does not overlap with the first candidate language. Specific examples of analysis techniques according to embodiments of the present invention will now be described. One example provides identification of up to two non-overlapping languages in a document using an optimized algorithm; another example provides identification of multiple languages.

Identification Process for Two Languages

Figure 2:
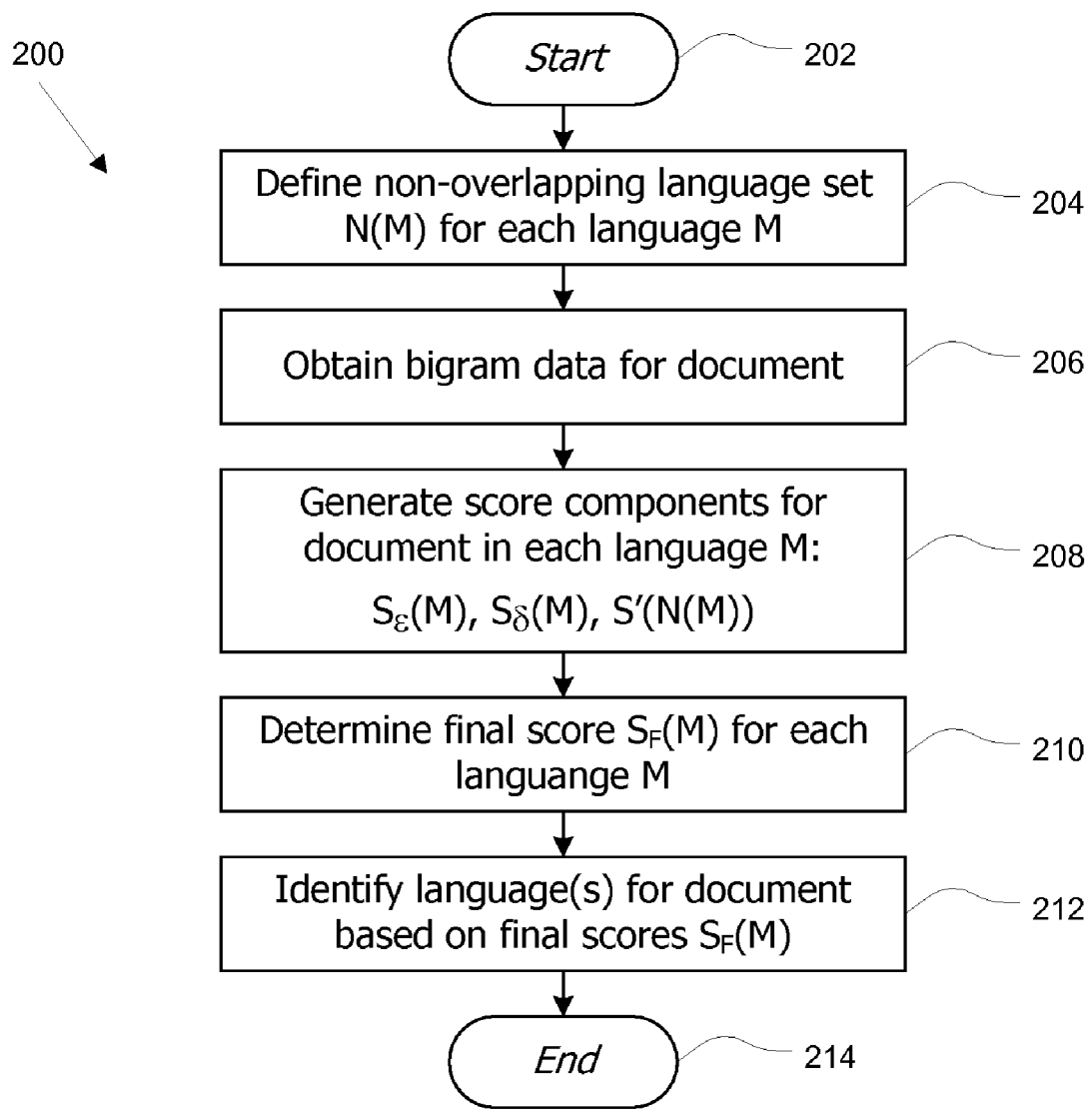
FIG. 2 is a flow diagram of a process for identifying up to two languages in a document according to an embodiment of the present invention.

FIG. 2 is a flow diagram of a process 200 for identifying up to two languages in a document according to an embodiment of the present invention. Process 200 can be implemented, e.g., in language identification program 120 of FIG. 1. In this process, for each language M, various hypotheses are tested, in particular the following:

Hypothesis 1: Document D is entirely in language M.

Hypothesis 2: Document D is partly in language M and partly in another language L that does not have bigrams overlapping with the bigrams of language M.

Multiple versions of Hypothesis 2, specific to different languages L, can be tested in parallel. In the end, the final score for language M is selected based on which of the above hypotheses is most likely. Comparing final scores across languages M leads to a conclusion, either that the document is in one language $M_0$ or that the document is in two languages $M_0$ and $L_0$, depending on whether Hypothesis 1 or 2 yielded the final score for language $M_0$.

Process 200 starts (step 202) with the assumption that language models 132 have already been created for each language in some predefined set of candidate languages; the particular technique used to create the language models and the particular selection of candidate languages are not critical to the present invention.

At step 204, for each language M in the set of candidate languages, a set N(M) of "non-overlapping" languages is defined. The set N(M) consists of all candidate languages that do not overlap with language M. As used herein, the overlap of languages can be defined in terms of the number of characters they have in common in a standard character coding scheme such as UTF-16. For example, a pair of languages that have different UTF-16 code points assigned to them can be defined as "non-overlapping" while a pair of languages with at least some UTF-16 code points assigned to both are "overlapping." For a given language M, the languages in set N(M) might or might not overlap with each other, as long as none of the languages in set N(M) overlaps with M. For example, consider a case where the candidate languages are Arabic, Chinese, English, French, Japanese, and Russian. If M is Japanese, then N(M) might include English, French, Russian and Arabic; even though English and French overlap with each other, neither overlaps with Japanese character sets. Or, if M is English, N(M) might include Japanese, Chinese, Russian and Arabic but would not include French because the character sets for English and French overlap significantly.

Alternatively, overlap can be defined based on whether the languages have any bigrams in common. In one embodiment, if the language models for languages $M_1$ and $M_2$ have no bigrams B for which $P_{M1}(B)$ and $P_{M2}(B)$ are both greater than the default probability, then M1 and M2 are non-overlapping languages.

It should be noted that the set N(M) for each language M can be defined in advance of processing any particular document; a list of non-overlapping languages for each language M can be stored in language model database 124 of FIG. 1. Thus, step 204 need not be performed each time process 200 is executed for a different document.

At step 206, bigram data for a target document (i.e., a document to be classified as being in one or more languages) is obtained. Bigram data can be obtained in a variety of ways. In one embodiment, the bigram data is provided in the form of a bigram frequency vector, with each component being associated with a particular bigram and the value of that component being proportional to the number of occurrences of that bigram in the target document. In another embodiment, the bigram data provides frequency information for a large number (e.g., ~1 million) of bigrams useful for distinguishing languages. The bigrams of interest can be represented using a two-dimensional array W with one dimension of the array corresponding to the first character of a bigram and the other dimension corresponding to the second character. For bigram B consisting of character string $b_1 b_2$, the frequency $w_B$ can be stored at array location $W(b_1, b_2)$.

Figure 3:
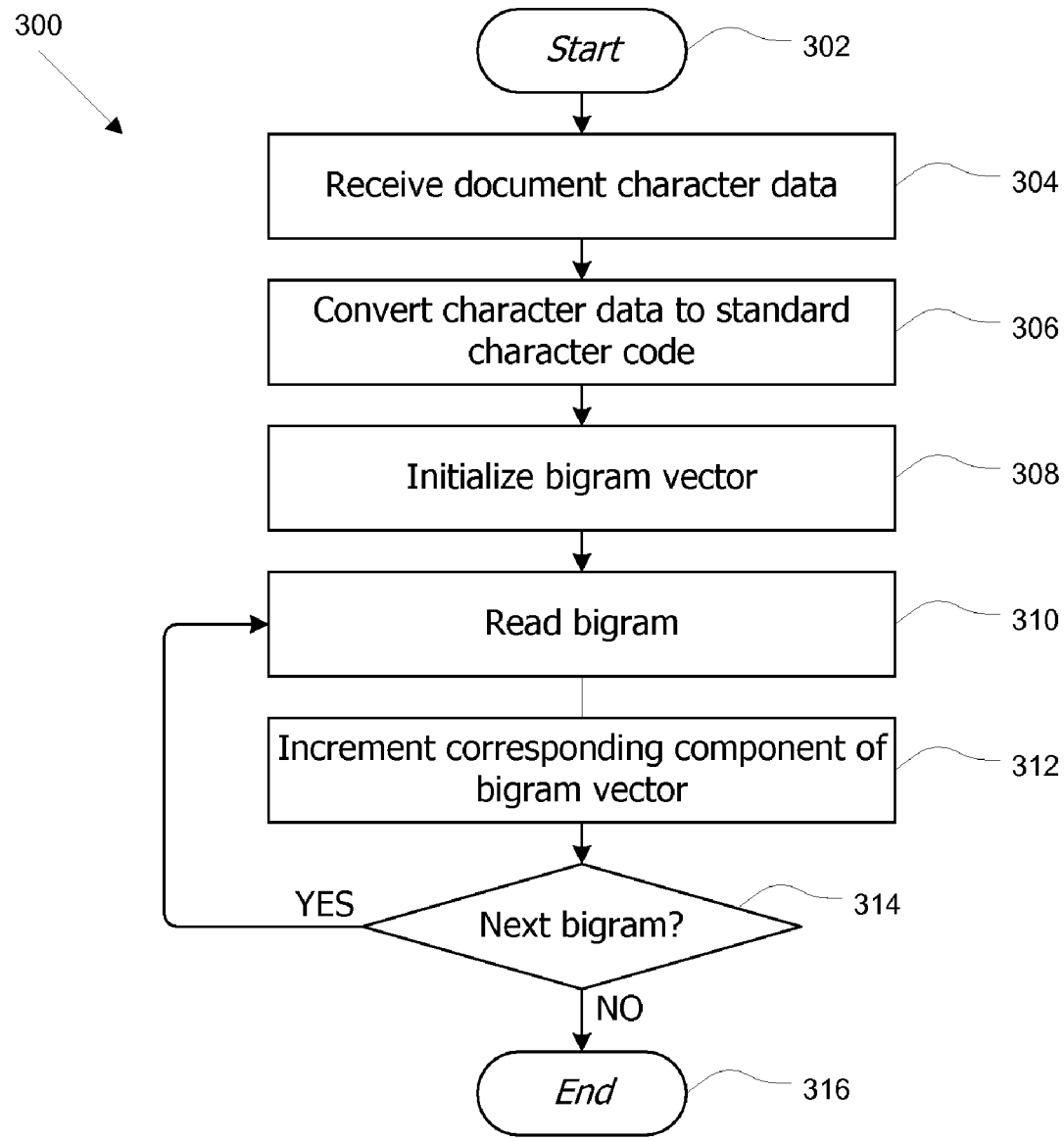
FIG. 3 is a flow diagram of a process that can be used to obtain bigram data according to an embodiment of the present invention.

FIG. 3 is a flow diagram of a process 300 that can be used to obtain bigram data for a document according to an embodiment of the present invention. Process 300 starts (step 302) with a target document having character data. The character data is received (e.g., extracted from the document) at step 304. At step 306, the character data can be converted to a standard character coding scheme, e.g., UTF-16. Converting all documents to a standard character coding scheme, while not required, simplifies the language models 132 in that character and bigram probability data can be maintained for only the standard coding scheme. In some embodiments, documents may be converted to the standard coding scheme as they are added to document repository 126, and step 306 can be omitted.

At step 308, a bigram vector or array is initialized. In one embodiment, a bigram vector can be defined by arranging all possible bigrams or all bigrams of interest in the standard coding scheme according to some convenient sequence. In another embodiment, a bigram array can be defined as described above. In either case, the components of the vector or array are advantageously initialized to zero.

The character data is then processed to populate the bigram vector or array. At step 310 a first bigram is read from the character data. At step 312, the corresponding component of the bigram vector or array is incremented. In embodiments where not all bigrams are represented in the bigram vector or array, a bigram that is not represented is simply ignored. At step 314, if more bigrams remain, the process returns to step 310 to read the next bigram. Otherwise, process 300 ends (step 316). Thus, upon completion of process 300 a bigram vector or array is produced that represents the number of occurrences of each possible bigram in the target document.

It should be noted that generating a bigram vector or array is optional; it is possible to step through the document sequentially for each language analyzed to compute the scores described below. However, those skilled in the art will appreciate that the bigram vector or array speeds up the score computation by reducing the number of lookup operations in language model database 124.

Referring again to FIG. 2, after the bigram data for the target document has been obtained, at step 208, several potential score components for the target document in each candidate language M are generated based on the bigram data and the language models. These score components are used to test the competing hypotheses for each language M as outlined above. In one embodiment, two score components plus a set of alternative-language scores are generated for each candidate language M.

The first score component, $S_\epsilon(M)$, also referred to as the "non-default" score component, is generated using only those bigrams that have greater than the default probability of occurring in language M. For instance, if M is English, then any bigram containing a non-Latin character (such as a Japanese or Chinese character) would have at most the default probability of occurring. Such bigrams, referred to herein as "default bigrams," do not contribute to $S_\epsilon(M)$.

The second score component, $S_\delta(M)$, also referred to as the "default" score component, is generated based on the occurrence of default bigrams for language M. $S_\delta(M)$ is advantageously defined in such a way that it reflects the number or frequency of default bigrams for language M.

The alternative-language scores, $S_M'(L)$ for each L in set N(M), are generated based on default bigrams for language M. Each time a default bigram for language M is encountered, it can be inferred that this bigram may be non-default in a language that does not overlap with M, i.e., a language L that is in set N(M). Thus, each time a default bigram for language M is encountered, the score of that bigram in each language L in set N(M) is added to the corresponding alternative-language score S'(L).

Figure 4:
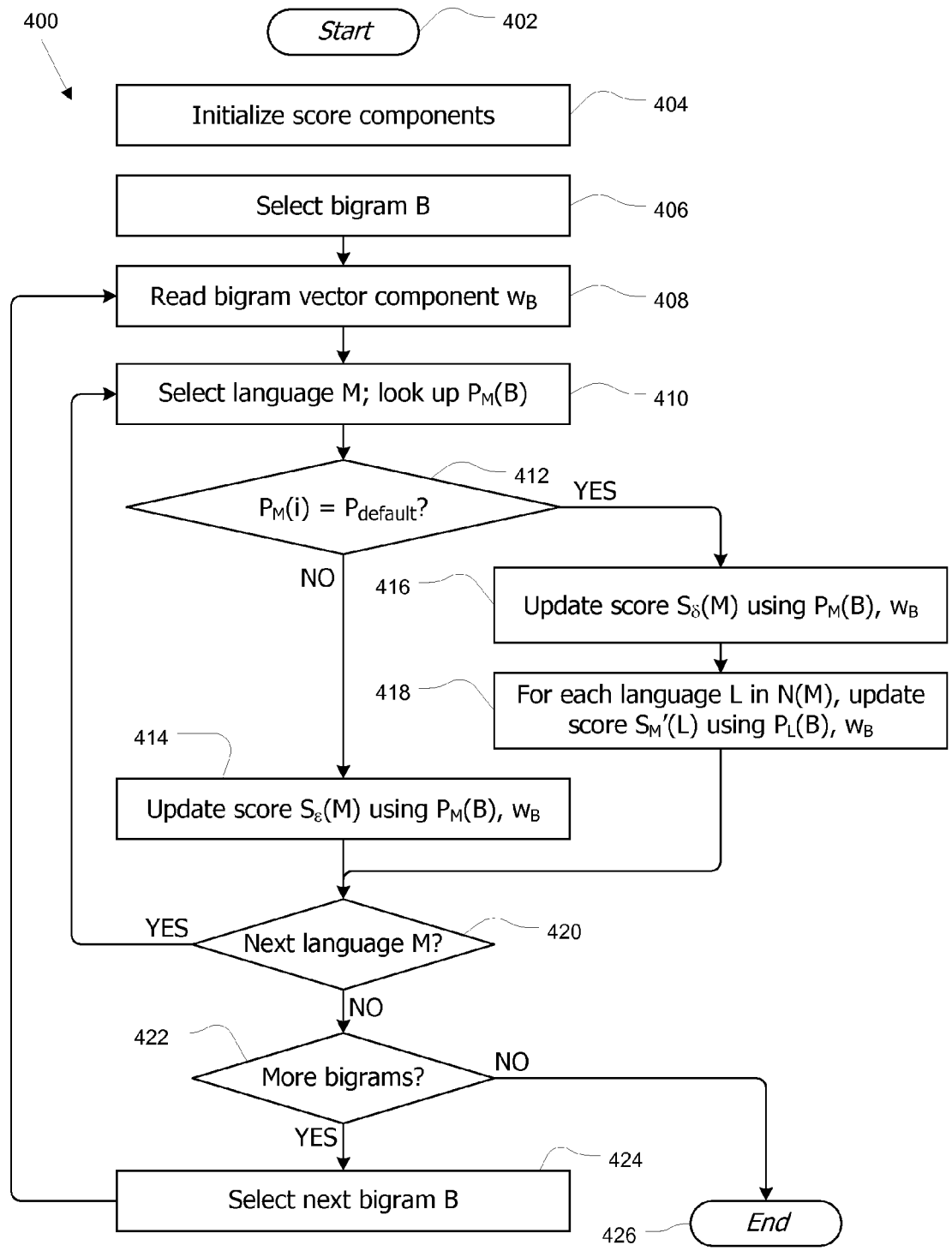
FIG. 4 is a flow diagram of a process for computing score components for the process of FIG. 2 according to an embodiment of the present invention.

FIG. 4 is a flow diagram of a process 400 for computing these score components according to an embodiment of the present invention. Process 400 can be implemented at step 208 of process 200. In process 400, a bigram array W representing the document content has been generated using process 300 of FIG. 3; as described above, each element $w_B$ of the bigram array W is equal to the number of occurrences of bigram B in the target document. Process 400 starts (block 402) with initialization of the score component for each candidate language M. In one embodiment, non-default score component $S_\epsilon(M)$ is initialized based on the unconditional probability of the first character in the document occurring in language M, e.g., corresponding to the $P_M(c_0)$ term in Eq. (2) above. Alternatively, the contribution of the first character can be omitted from Eq. (2), and all scores $S_\epsilon(M)$ can be initialized to the same value (e.g., zero). Default score component $S_\delta(M)$ and all alternative-language scores $S_M'(L)$ can also be initialized to a constant value (e.g., zero).

At step 406 a first bigram B is selected. In one embodiment, bigrams are selected by stepping sequentially through the elements of bigram array W, but any selection order can be used. At step 408, the corresponding bigram array element $w_B$ is read from the bigram array. At step 410 a candidate language M is selected and $P_M(B)$ for bigram B is looked up in the language model database 132.

At step 412, it is determined whether $P_M(B)$ is the default probability, or in other words, whether bigram B is a default bigram for language M. If not, then the non-default score component $S_\epsilon(M)$ for language M is updated at step 414 using $P_M(B)$ and the bigram vector component $w_B$. For example, if the scoring model of Eq. (2) is used, then $S_\epsilon(M)$ can be updated according to:

$$S_\epsilon(M) = S_\epsilon(M) + w_B * \log\left[\frac{1}{P_M(B)}\right]. \quad (5)$$

If, at step 412, $P_M(B)$ is the default probability, then the default score component $S_\delta(M)$ for language M is updated (step 416) using $P_M(B)$ and $w_B$. For example, if the scoring model of Eq. (2) is used, then $S_\delta(M)$ can be updated according to:

$$S_\delta(M) = S_\delta(M) + w_B * \log\left[\frac{1}{P_M(B)}\right]. \quad (6)$$

As will be seen, it is beneficial if $S_\delta(M)$ provides a measure of the number of default bigrams for language M. Eq. (6) provides such a measure, as long as $P_M(B)$ is always the same (default) value for all bigrams contributing to $S_\delta(M)$ for a particular language M. Alternatively, process 200 could keep a count of the number of default bigrams encountered for each language M; this count can be multiplied by the default probability after bigram processing is complete to determine the final default score component $S_\delta(M)$.

Next, the possibility that the default bigram is due to the presence of a non-overlapping language in the document is considered. Specifically, at step 418, for each language L in the set N(M) of languages that are non-overlapping with language M, an alternative-language score $S_M'(L)$ is updated using $P_L(B)$ and $w_B$. For example, if the scoring model of Eq. (2) is used, then each $S_M'(L)$ can be updated according to:

$$S_M'(L) = S_M'(L) + w_B * \log\left[\frac{1}{P_L(B)}\right]. \quad (7)$$

Note that $P_L(B)$ in this instance might or might not be the default probability.

Once the score components have been updated, at step 420, it is determined whether more candidate languages M remain to be considered. If so, process 400 returns to step 410 to process the next candidate language. (In some embodiments, multiple candidate languages M can be processed in parallel for a given bigram.)

At step 422, it is determined whether more bigrams remain to be processed. If so, the next bigram B is selected at step 424, and process 400 returns to step 406 to process the next bigram over the set of candidate languages. If not, process 400 ends (step 426). In one embodiment, the resulting score components for language M are:

(1) the non-default score component, based on bigrams B that are non-default bigrams in language M:

$$S_\epsilon(M) = \log\left[\frac{1}{P_M(c_0)}\right] + \sum_{B=non-default(M)} w_B * \log\left[\frac{1}{P_M(B)}\right]; \quad (8)$$

(2) the default score component, based on bigrams B that are default bigrams in language M:

$$S_\delta(M) = \sum_{B=default(M)} w_B * \log\left[\frac{1}{P_M(B)}\right]; \text{ and} \quad (9)$$

(3) an alternative-language score $S_M'(L)$ for each language L in non-overlapping set N(M), also based on bigrams B that are default bigrams in language M:

$$S_M'(L) = \sum_{B=default(M)} w_B * \log\left[\frac{1}{P_L(B)}\right]. \quad (10)$$

It is to be understood that the particular scoring technique shown in FIG. 4 is optional and alternative techniques, including but not limited to the scoring model of Eq. (1) may be substituted. Further, it should be noted that each language for which a language model is available can be used as a candidate language M and that any given candidate language M can also be in the non-overlapping language set N(M') for any number of other candidate languages M'.

Referring again to FIG. 2, once the score components have been calculated for each language M (step 208), a final score $S_F(M)$ is determined for each language at step 210. The final score $S_F(M)$ advantageously reflects the probability of the more likely hypothesis for the candidate language M, selected from Hypotheses 1 and 2 described above. In one embodiment, final score $S_F(M)$ combines the non-default score component $S_F(M)$ with either the default score component $S_\delta(M)$ or one of the alternative score components $S_M'(L)$.

Figure 5:
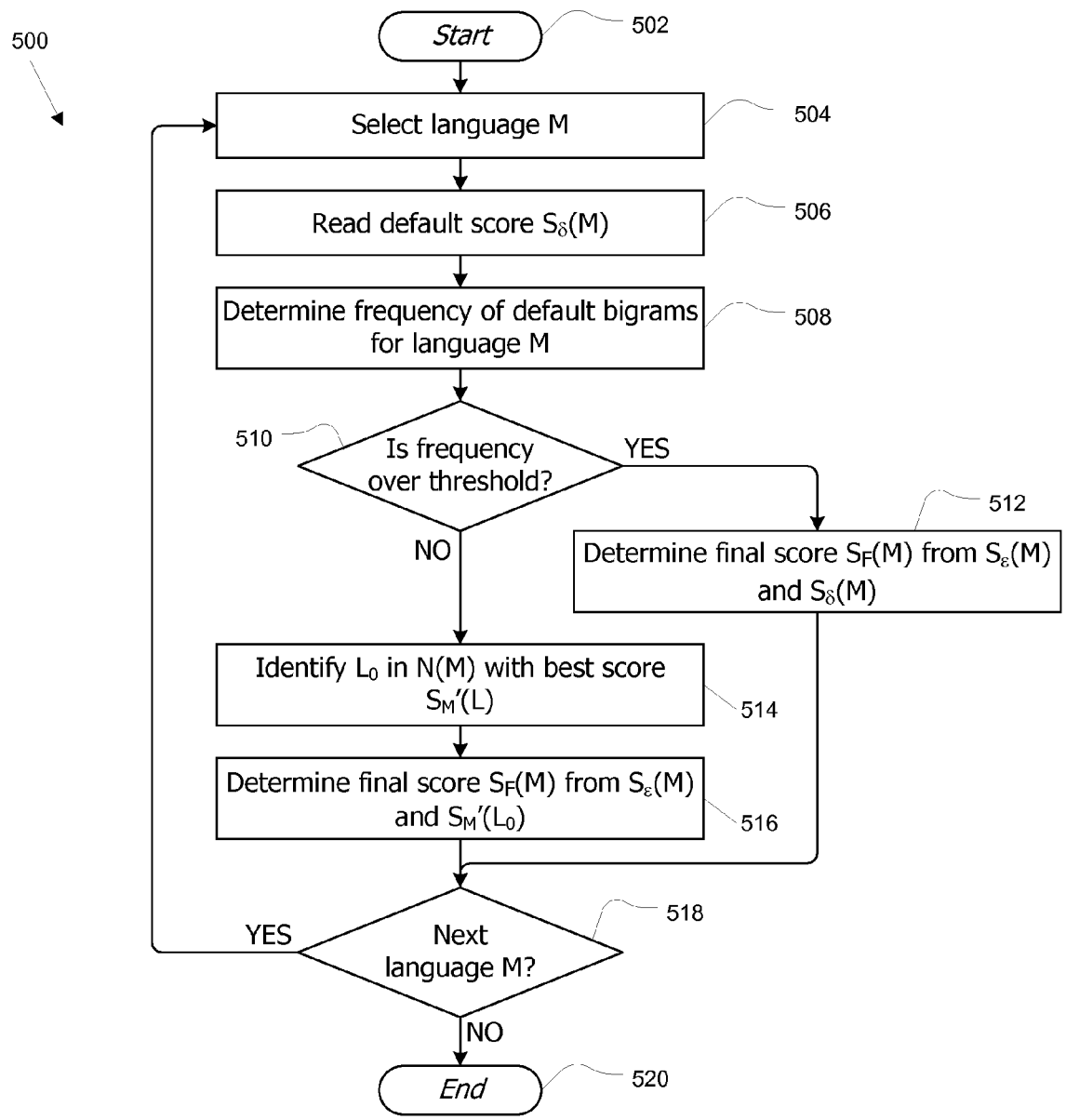
FIG. 5 is a flow diagram of a process that can be used to compute a final score according to an embodiment of the present invention.

For example, FIG. 5 is a flow diagram of a process 500 that can be used to compute a final score according to an embodiment of the present invention. Process 500 starts (block 502) after score components have been computed using process 400 of FIG. 4 described above.

At step 504 a language M is selected. At step 506, the default score $S_\delta(M)$ for selected language M is read. At step 508, the frequency of occurrence of default bigrams for language M is determined from $S_\delta(M)$. For example, if Eq. (6) was used to generate $S_\delta(M)$, then $S_\delta(M)$ is proportional to the number of default bigrams in the document. Dividing $S_\delta(M)$ by the total number of characters in the document provides an indication of the frequency of occurrence of default bigrams for language M.

At step 510, it is determined whether this frequency exceeds a threshold. The threshold for step 510 can set such that if the frequency exceeds the value, it is highly unlikely that language M is the primary language of the document. In one embodiment, the threshold corresponds to a default bigram frequency of 50%. If the frequency exceeds the threshold, then at step 512, a final score $S_F(M)$ is computed using $S_\epsilon(M)$ and $S_\delta(M)$. For example, where the scoring model of Eq. (2) is used, step 512 can include computing:

$$S_F(M) = S_\epsilon(M) + S_\delta(M). \quad (11)$$

If, at step 510, the frequency does not exceed the threshold, consideration is given to Hypothesis 2, i.e., that part of the document is in language M while another part is in a language L in the non-overlapping set N(M). Specifically, at step 514, the language $L_0$ in set N(M) that has the best alternative score $S_M'(L)$ is identified. (Note that if the scoring model of Eq. (2) is in use, then the "best" score would be the lowest score.) The final score $S_F(M)$ is computed using $S_\epsilon(M)$ and $S_M'(L_0)$ at step 516. For example, where the scoring model of Eq. (2) is used, step 516 can include computing:

$$S_F(M) = S_\epsilon(M) + S_M'(L_0). \quad (12)$$

At step 518, if more languages M remain to be considered, process 500 returns to step 504 to select another language M. Once all languages M have been considered, process 500 ends (block 520).

Referring once again to FIG. 2, once the final scores $S_F(M)$ have been computed, one or more languages are identified for the document (step 212). For example, in one embodiment, the language $M_0$ with the best final score $S_F(M)$ is identified as the primary language. (Again, if the scoring model of Eq. (2) is used, the "best" score would be the lowest score.) If $S_F(M)$ includes a contribution from $S_{M'}(L_O)$ for some non-overlapping language $L_O$, then $L_O$ is also identified as a language of the document.

It will be appreciated that language identification process 200 described herein is illustrative and that variations and modifications are possible. Steps described as sequential may be executed in parallel, order of steps may be varied, and steps may be modified or combined. As noted, different scoring models can be used. Each language for which a model is available can be considered as both a candidate language M and a member of the set of non-overlapping languages N(M') for any number of other candidate languages M'. Thus, for two non-overlapping languages $A_i$, $A_j$, process 200 can test the hypothesis $\{M_0=A_i; L_O=A_j\}$ and the hypothesis $\{M_0=A_j; L_O=A_i\}$.

Identification Process for Arbitrary Number of Languages

Figure 6:
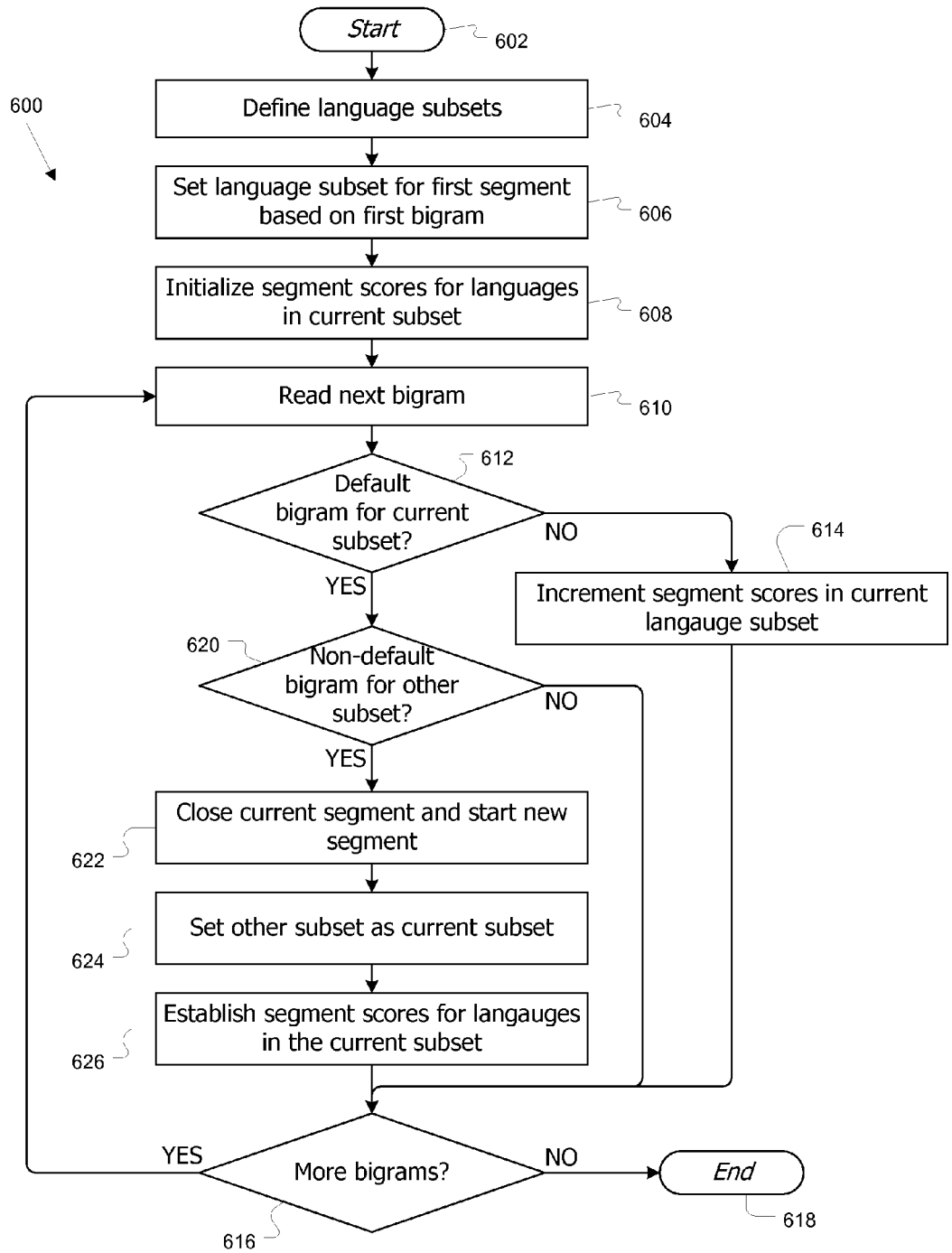
FIG. 6 is a flow diagram of a process for identifying multiple constituent languages within a document according to an embodiment of the present invention.

Other embodiments of the present invention consider that a document may be in more than two languages. For example, FIG. 6 is a flow diagram of a process 600 for identifying multiple constituent languages within a document according to an embodiment of the present invention.

Process 600 starts (block 602) with defining subsets of the candidate languages at step 604. In one embodiment, the set of candidate languages (i.e., all languages for which language models are available) is divided into disjoint subsets $A_i$ of mutually overlapping languages. These subsets have the property that, for any i≠j, if language $L_i$ is in subset $A_i$ and language $L_j$ is in subset $A_j$, then $L_i$ and $L_j$ are non-overlapping. If $L_i$ and $L_j$ are overlapping, then both are in the same subset $A_k$. In one embodiment, overlapping languages are defined such that two languages $L_i$ and $L_j$ overlap if there is at least one bigram B (made up of characters $b_1b_2$) for which $P_{Li}(b_2|b_1)$ and $P_{Lj}(b_2|b_1)$ are both non-default. It should be noted that the disjoint subsets $A_i$ can be defined in advance of processing any particular document; a list of member languages L in each disjoint subset $A_i$ can be stored in language model database 124 of FIG. 1. Thus, step 604 need not be performed each time process 600 is executed for a different document.

Under the above definition of subsets $A_i$, a bigram B will have a non-default probability for languages in no more than one of the subsets $A_i$. (Note that bigrams that do not occur in any language may have the default probability for all subsets.) Process 600 uses this property to detect transitions between a subset $A_i$ and a different subset $A_j$ and thereby divide the document into segments. Bigrams are processed sequentially; as long as the current bigram has non-default probability in at least one language in subset $A_i$, only languages in $A_i$ are considered. When a bigram is encountered that has the default probability for all languages in subset $A_i$, process 600 determines whether the bigram is non-default in a different subset $A_j$. This occurrence marks a transition between language subsets and the dividing point between segments. For bigrams in the new segment, process 600 considers languages in subset $A_j$. Thus, division of a document into segments is not tied to specific document features such as paragraph breaks, section headings or the like.

More specifically, at step 606, one of the language subsets (e.g., subset $A_1$) is selected as the language subset for the first segment of the document. The selection can be made by reading the first bigram of the document and determining which of the language subsets has at least one language where the first bigram is non-default. At step 608, a segment score $S_M(t=1)$ (where t is a segment index) is initialized for each language M in subset $A_1$. For example, where the scoring model of Eq. (2) is used and the document begins with bigram $c_0c_1$, the initial score for language M can be:

$$S_M(t) = \log\left[\frac{1}{P_M(c_0)}\right] + \log\left[\frac{1}{P_M(c_1|c_0)}\right]. \quad (13)$$

As in other embodiments described above, different scoring models can also be used.

At step 610, the next bigram is read. If (step 612) the next bigram is not a default bigram for the current language subset $A_1$—i.e., if the bigram is non-default bigram for at least one language in subset $A_1$—then segment scores for each language M in subset $A_1$ is incremented at step 614. For example, where the scoring model of Eq. (2) is used and the bigram $c_nc_{n+1}$ is encountered, the scores can be updated according to:

$$S_M(t) = S_M(t) + \log\left[\frac{1}{P_M(c_{n+1}|c_n)}\right]. \quad (14)$$

At step 616, if more bigrams remain, process 600 returns to step 610 to read the next bigram; otherwise process 600 ends (step 618).

If, however, it is determined at step 612 that the bigram is a default bigram for the current language subset (i.e., the bigram is a default bigram for every language in the current subset), then at step 620, it is determined whether the bigram is a non-default bigram in a different language subset (i.e., the bigram is not a default bigram for at least one language in the different subset). All language subsets other than the current subset (e.g., $A_1$) can be considered. If not, then process 600 proceeds to step 616 and either reads the next bigram (step 610) if any bigrams remain or ends (step 618).

If, at step 620, it is determined that the bigram is non-default for a different language subset, e.g., subset $A_2$, then the current bigram marks a transition between subsets and therefore the beginning of a new document segment. Accordingly at step 622, the current segment is closed and a new segment begins (step 622). This segment transition may include incrementing segment counter t and/or storing the scores obtained from the previous segment such that those scores are not affected by further score update operations. A bigram that passes the tests at both of steps 612 and 620 can be identified as a "transition bigram" for the document.

At step 624, the language subset (e.g., $A_2$) in which the transition bigram is non-default is selected as the current language subset. At step 626, a segment score is established for every language M in the now-current language subset. For example, Eq. (13) above can be used, with $c_0c_1$ now representing the first bigram of the new segment and M now representing a language in subset $A_2$. As noted above, a different scoring model can be used; however, the same scoring model is advantageously used for all segments. (It should be remembered that $A_1$ and $A_2$ are disjoint, therefore languages that had a score in the immediately previous segment will not have a score in the current segment.) At step 616, process 600 continues to the next bigram or exits if no more bigrams remain.

Process 600 can be used to generate segment scores for any number of document segments, and a segment can have any length. The segments are defined dynamically, based on the sequence of bigrams found in the document, rather than relying on any predetermined feature such as paragraphs, sentences, headings or the like. Thus, one segment may encompass pages of text while another segment might be a single word of one language embedded in a paragraph of text in another language. Each segment yields scores for one subset of the candidate languages. All languages outside the candidate subset can be assumed to have a default score, or zero score, for that segment. In one embodiment, where each segment t has an active subset $A_t$, process 600 results in segment scores $S_t(L)$ for each language L in subset $A_t$ of the form:

$$S_t(L) = \log\left[\frac{1}{P_L(c_0)}\right] + \sum_{i=1}^{n-1}\log\left[\frac{1}{P_L(c_i|c_{i-1})}\right], \quad (15)$$

where n is the number of characters in segment t. Scores $S_t(L)$ for any language L not in subset $A_t$ need not be generated. Since $P_L(c_i|c_{i-1})$ for L not in subset $A_t$ is by definition the default probability, such scores would simply be a default score, e.g., the log of the reciprocal of the default probability multiplied by the number of bigrams in segment t.

Figure 7:
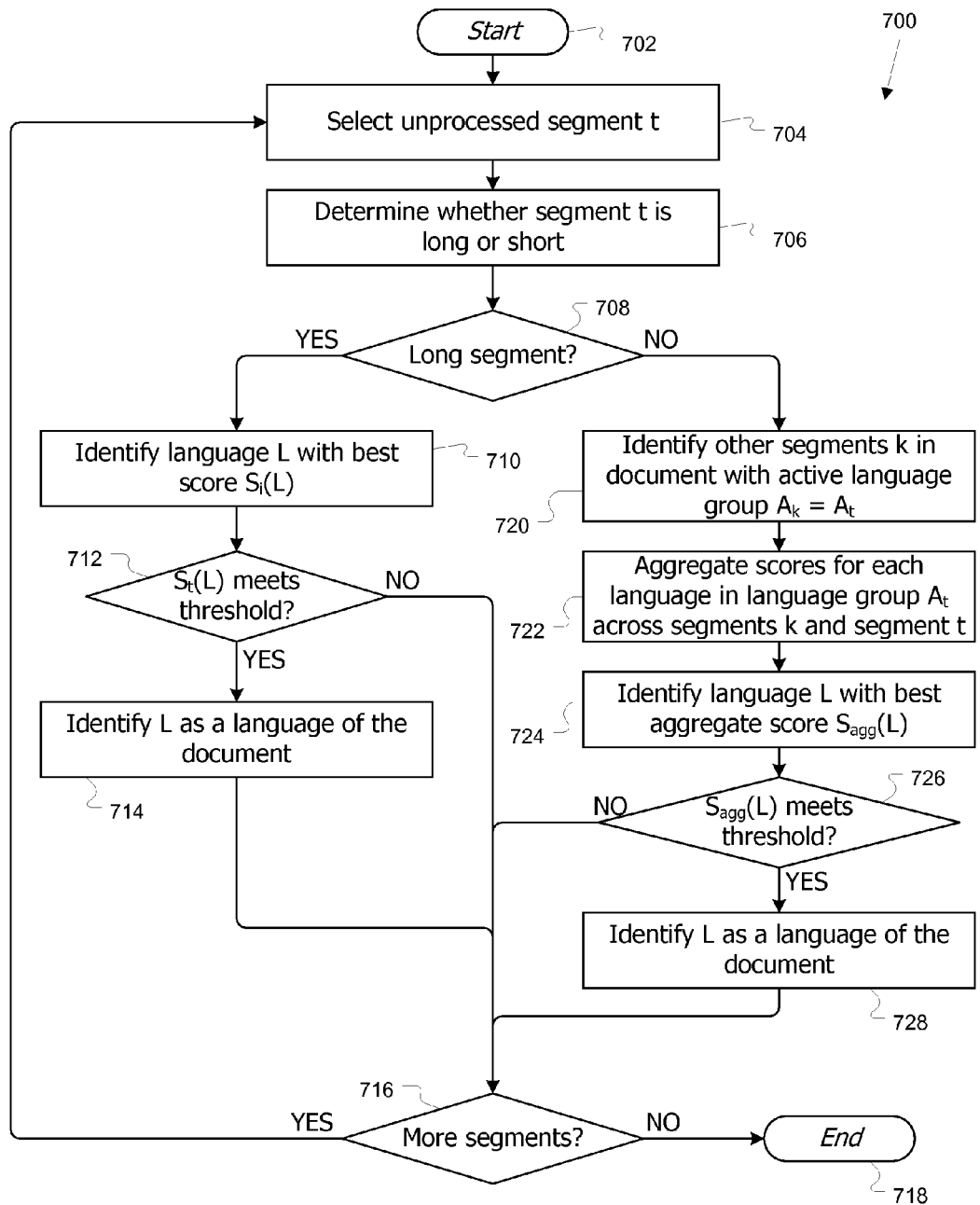
FIG. 7 is a flow diagram of a process for language identification according to an embodiment of the present invention.

The segment scores can then be used to identify languages that appear in the document. FIG. 7 is a flow diagram of a process 700 for language identification according to an embodiment of the present invention. Process 700 starts (block 702) after segment scores $S_t(L)$ for languages L in the active subset $A_t$ have been determined for each segment t. At step 704, a first unprocessed segment t is selected. In one embodiment, segments are selected in the order they appear in the document. At step 706, it is determined whether segment t is a long segment or a short segment. In one embodiment, long and short segments are distinguished by number of characters in the segment.

For instance, a threshold can be set, and if the number of characters exceeds the threshold, then the segment is considered long; otherwise the segment is short. The particular choice of an optimum threshold for distinguishing long segments from short segments is dependent on the language models used. In general, the threshold can be optimized by determining a minimum number of bigrams required to distinguish different languages with an acceptable level of reliability and adding a margin (e.g., 1%, 2%, or 5% to that number). In one embodiment, the document is tokenized (e.g., into "words") based on space characters or other separators, and the threshold is set based on the number of tokens required for acceptably reliable language identification (this can be, e.g., in a range from about 20 to about 50 tokens for some bigram-based language models). In another embodiment, the threshold can be set based on a number of bigrams (which might be, e.g., 100 bigrams) sufficient to provide acceptably reliable language identification.

If (step 708) the current segment t is a long segment, then at step 710, the language L in subset $A_t$ that has the best score $S_t(L)$ is identified. As noted previously, if the scoring model of Eq. (2) is used, the "best" score is the lowest score; if the scoring model of Eq. (1) is used, the "best" score is the highest score. At step 712, it is determined whether the best score satisfies a threshold test. The threshold can be defined, e.g., according to Eqs. (3) and (4) above, and the number of characters in the segment can be used to normalize the segment score $S_t(L)$. If the segment score for language L satisfies the threshold test, then it is inferred that language L is the language of the current segment t, and L is identified as a language of the document at step 714. If (step 716) more unprocessed segments remain, process 700 returns to step 704 to select another unprocessed segment; otherwise, process 700 ends (step 718).

Referring again to step 708, if the current segment is a short segment, process 700 attempts to aggregate, or combine, segment scores across multiple segments belonging to the same language subset. Aggregating short segments is motivated in part by the observation that the accuracy of bigram-based language identification tends to improve as the number of bigrams increases; thus, aggregating short segments is thus expected to improve accuracy. Accordingly, at step 720, process 700 identifies other segments k in the document for which active subset $A_k$ is the same as the active subset $A_t$ for current segment t. In one embodiment, only short segments k (as defined by the threshold test described above) are considered at step 720.

At step 722, the segment scores $S_k(L)$ for segments identified at step 720 are aggregated across segment t and the segments k identified at step 720. (Scores are not aggregated across languages.) For example, the segment scores can simply be added to produce a score $S_{agg}(L)$ for language L. Any segments k whose scores are aggregated with segment t at step 722 are thereafter regarded as already-processed segments.

At step 724, the language L with the best aggregate score $S_{agg}(L)$ is identified. (As noted elsewhere, the "best" score can be, e.g., the highest score or the lowest score depending on the scoring model used.) At step 726, a threshold test is applied to the best aggregate score $S_{agg}(L)$; this test may be the same as at step 712. If the best aggregate score satisfies the test, then language L is identified as a language of the document at step 728, and process 700 proceeds to step 716 to determine whether more segments remain.

It will be appreciated that language identification process 700 is illustrative and that variations and modifications are possible. Steps described as sequential may be executed in parallel, order of steps may be varied, and steps may be modified or combined. In some embodiments, all segments could be treated as short segments, thus providing identification of at most one dominant language from each non-overlapping subset of languages. In another embodiment some or all short segments might be discarded entirely as being too short to provide reliable information. For example, segments with fewer than 5 or 10 bigrams might be discarded, or short segments that cannot be aggregated with any other segments might be discarded.

In the embodiment described, process 700 provides a list of languages in the document. Further analysis can be performed to identify the relative portions of the document in each identified language. For example, the languages could be ranked according to the number of characters or bigrams associated with each identified language.

Process 700 does not impose any constraints on the number of languages identified for a document. For example, if the entire document is in a single language, the entire document would be processed as a single segment, and one language would be identified. Note that if a document includes portions in multiple languages that are all in the same subset of candidate languages, the document would be processed as a single segment and might be identified as a single-language document. In some such cases, the best score will fail the threshold test, and no languages will be identified.

Other techniques can also be used to identify languages based on segment scores $S_t(L)$. For example, the best-scoring language within each segment can be identified as a language of a document regardless of segment length. In another embodiment, a minimum cutoff on segment length can be imposed, and the best-scoring language within each segment that has at least the minimum length can be identified as a language of a document while segments having less than the minimum length are simply ignored. In still another embodiment, once languages are identified per segment (or for aggregated segments where applicable), further filtering can be done. For instance, a language L might be included in the list of languages for a document only if the segments identified as having language L, considered together, constitute at least a minimum fraction (e.g., 5%, 10%, 20%) of the total document content.

Figure 8:
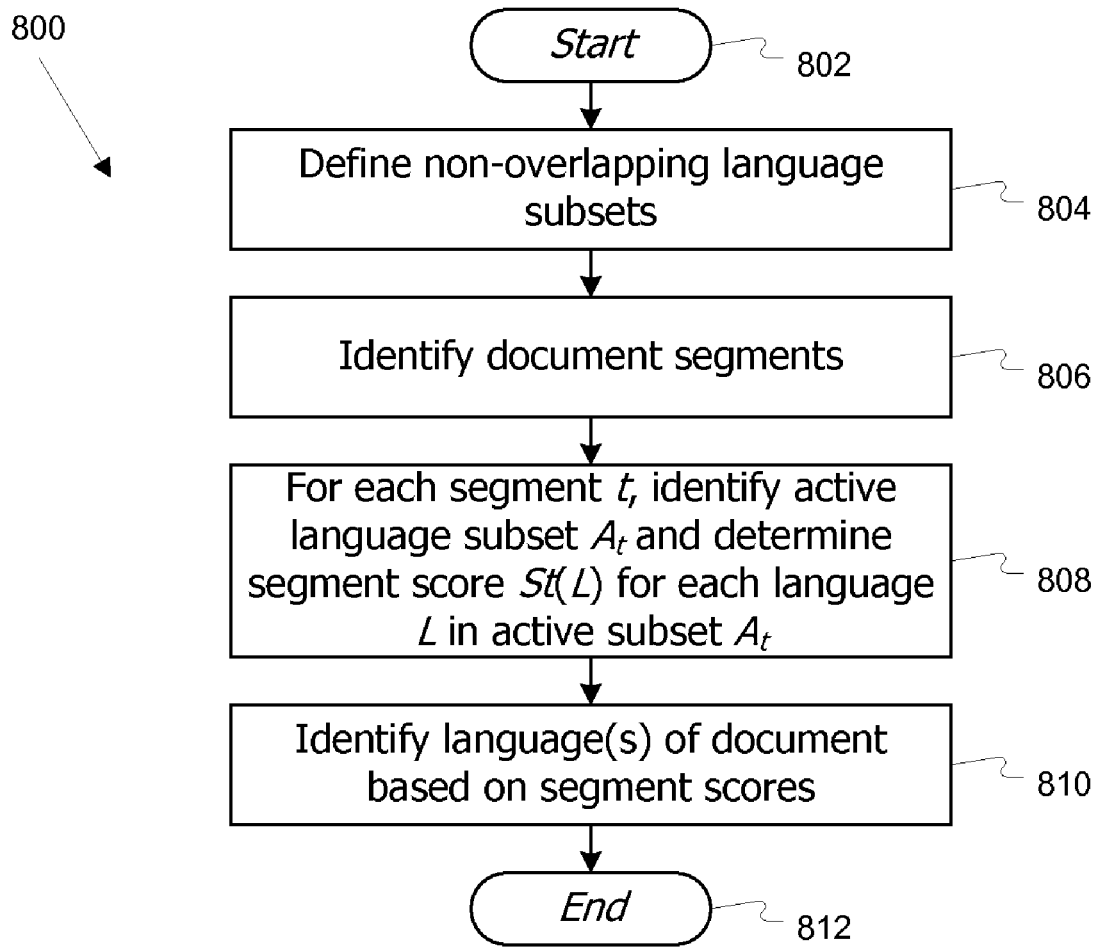
FIG. 8 is a flow diagram of a process for language identification according to an embodiment of the present invention.

FIG. 8 is a flow diagram of a process 800 for language identification according to an embodiment of the present invention. Process 800 starts (block 802) with defining a number of non-overlapping language subsets at step 804, e.g., similarly to step 604 of process 600 described above. At step 806, document segments are identified, e.g., using transition bigram detection as described above with reference to FIG. 6. At step 808, for each segment t, an active language subset $A_t$ is identified, and a segment score $S_t(L)$ for each language L in active subset $A_t$ is determined. In some embodiments, techniques described above with reference to FIG. 6 are used, and segments can be processed sequentially or in parallel. In one embodiment, a bigram vector can be constructed for each segment, and techniques described above with reference to FIG. 4 can be used to compute segment scores from the bigram vector. At step 810, one or more languages are identified as language(s) of the document based on the segment scores. For example, process 700 of FIG. 7 or other identification techniques described above can be used.

The techniques described herein can be used to identify multiple languages within a document in instances where those documents contain different languages that do not overlap, where "overlap" refers to languages having characters and/or bigrams in common. This can be useful, e.g., for identifying documents that have portions in an Asian language, for which further analysis may be needed to distinguish words. In addition, in instances where documents contain a mixture of Western and Asian languages, the presence of the Western characters can confuse conventional scoring algorithms; some embodiments of the present invention solve this problem by separately considering sections of the document that use Western characters and sections that use Asian characters.

While the invention has been described with respect to specific embodiments, one skilled in the art will recognize that numerous modifications are possible. For example, particular scoring techniques described herein can be replaced with different techniques, and n-grams other than bigrams (e.g., trigrams) could be used if desired. Different bigrams, languages, or documents can be processed sequentially or in parallel.

A particular character coding scheme is not required, and in some embodiments multiple coding schemes can be supported. As noted above, converting all documents to a common character coding scheme prior to analysis can simplify the language models and/or make it easier to identify non-overlapping language subsets; however, such conversion is not required. Documents need not be provided in the chosen character coding scheme; documents in other coding schemes can be converted to the chosen scheme, e.g., using character conversion tools known in the art. Any type of document may be processed using the techniques described herein or similar techniques, provided only that the document is available or can be made available with a usable character coding.

In some embodiments, it is possible that no languages will be identified for a particular document, e.g., if the best score for any language does not satisfy a threshold test. This result can be recorded in document information database 122, for example by storing a special code in language field 130 associated with document ID 128 for a document that was not identified with any language. Where no language is identified using techniques described herein, other techniques (including other automated analysis techniques and/or review by a person) can be used to attempt to identify the language(s).

As described above, embodiments of the present invention may be implemented as computer programs. Such programs may be encoded on various computer readable media for storage and/or transmission; suitable media include magnetic disk or tape, optical storage media such as compact disk (CD) or DVD (digital versatile disk), flash memory, and the like. Computer readable media encoded with the program code may be packaged with a device (e.g., microprocessor) capable of executing the program or provided separately from such devices.

In addition, while the embodiments described above may make reference to specific hardware and software components, those skilled in the art will appreciate that different combinations of hardware and/or software components may also be used and that particular operations described as being implemented in hardware might also be implemented in software or vice versa.

Thus, although the invention has been described with respect to specific embodiments, it will be appreciated that the invention is intended to cover all modifications and equivalents within the scope of the following claims.

What is claimed is:

1. A method of identifying one or more languages for a document, the languages being selected from a set of candidate languages, the method comprising:

for each language (M) in the set of candidate languages, defining a set of non overlapping languages (N(M)), the set N(M) consisting of one or more languages (L), wherein each language L in the set N(M) does not overlap with the language M;

obtaining n-gram data for a target document;

for each language M in the set of candidate languages, using the n-gram data to determine a final score $S_F(M)$ based on relative probabilities of a first hypothesis that the target document is entirely in the language M and a second hypothesis that one portion of the target document is in the language M while another portion of the target document is in a language L selected from the set N(M);

identifying, by a processor, one or more of the candidate languages as being languages of the document based on the final scores $S_F(M)$ for different languages M; and storing, in a computer readable storage device, information indicating the one or more languages of the document.

2. The method of claim 1 wherein each language L in the set N(M) for the language M has no characters in common with the language M.

3. The method of claim 1 wherein each language L in the set N(M) for the language M has no n-grams in common with the language M.

4. The method of claim 1 wherein obtaining n-gram data for the target document includes converting character data for the target document to a character coding scheme for which an n-gram based language model for each candidate language M is available.

5. The method of claim 1 wherein the n-grams are bigrams.

6. The method of claim 1 wherein determining a final score $S_F(M)$ for one of the languages M includes:

computing a non-default score component ($S_\delta(M)$) based on n-grams in the target document that have greater than a default probability of occurring in the language M;

computing a default score component ($S_\delta(M)$) based on n-grams in the target document that do not have greater than the default probability of occurring in the language M;

computing an alternative-language score component ($S_M'(L)$) for each language L in the set N(M), the alternative-language score component being based on the n-grams in the target document that do not have greater than the default probability of occurring in the language M; and determining the final score $S_F(M)$ based on the non-default score component $S_\epsilon(M)$ and one or both of the default score component $S_\delta(M)$ or one of the alternative-language score components $S_M'(L)$.

7. The method of claim 6 wherein the n-grams are bigrams and the non default score component $S_\epsilon(M)$ for the language M is given by:

$$S_\epsilon(M) = \log\left[\frac{1}{P_M(c_0)}\right] + \sum_{B=non-default(M)} w_B * \log\left[\frac{1}{P_M(B)}\right],$$

wherein $c_0$ represents a first character in the document, wherein $P_M(c_0)$ is a probability of the character $c_0$ occurring in the language M, wherein the sum is over the bigrams B in the target document that have greater than the default probability of occurring in the language M, wherein $w_B$ is proportional to the number of occurrences of the bigram B in the target document, and wherein $P_M(B)$ is the probability of the bigram B occurring in the language M.

8. The method of claim 7 wherein the default score component $S_\delta(M)$ for the language M is given by:

$$S_\delta(M) = \sum_{B=default(M)} w_B * \log\left[\frac{1}{P_M(B)}\right],$$

wherein the sum is over the bigrams B in the target document that do not have greater than the default probability of occurring in language M and wherein $w_B$ is proportional to the number of occurrences of the bigram B in the target document.

9. The method of claim 8 wherein the alternative language score $S_M'(L)$ for each language L in the set N(M) is given by:

$$S_M'(L) = \sum_{B=default(M)} w_B * \log\left[\frac{1}{P_L(B)}\right],$$

wherein the sum is over the bigrams B in the target document that do not have greater than the default probability of occurring in the language M, wherein $w_B$ is proportional to the number of occurrences of the bigram B in the target document, and wherein $P_L(B)$ is the probability of the bigram B occurring in the language L.

10. The method of claim 6 wherein determining the final score $S_F(M)$ includes:

determining whether a frequency of occurrence in the target document of bigrams having no greater than the default probability of occurrence in the language M exceeds a threshold;

in the event that the frequency exceeds the threshold, computing the final score $S_F(M)$ using the non default score component $S_\epsilon(M)$ and the default score component $S_\delta(M)$; and in the event that the frequency does not exceed the threshold, computing the final score $S_F(M)$ using the non default score component $S_\epsilon(M)$ and the best one of the alternative language score components $S_M'(L)$.

11. The method of claim 10 wherein identifying one or more languages for the target document includes:

identifying a language $M_0$ from the set of candidate languages as having the best final score $S_F(M)$;

identifying the language $M_0$ as a first language of the target document;

determining whether the final score $S_F(M_0)$ for language $M_0$ includes a contribution from an alternative-language score component for a language $L_0$; and in the event that the final score $S_F(M_0)$ for language $M_0$ includes a contribution from an alternative-language score component for a language $L_0$, identifying the language $L_0$ as a second language of the target document.

12. A system for identifying one or more languages in a document, the system comprising:

a language model data store configured to store an n-gram based language model for each of a plurality of languages;

a document information data store configured to store information for each of a plurality of documents, the information including language identifying information indicating one or more languages associated with the document; and a processor coupled to the language model data store and the document information data store, the processor being configured to execute language identification processes, the language identification processes including:

a first process that, when executed, generates n-gram data for a test document;

a second process that, when executed, generates a final score for the test document based on the n-gram data and the n-gram based language model for a candidate language M, wherein the final score is based on relative probabilities of a first hypothesis that the target document is entirely in the candidate language M and a second hypothesis that one portion of the target document is in the candidate language M while another portion of the target document is in an alternative language L wherein the alternative language L does not overlap with the candidate language M; and a third process that, when executed, identifies one or more languages for the test document based on the final scores produced by the second process for each of a plurality of candidate languages.

13. The system of claim 12 wherein the third process, when executed, further stores information indicating the identified one or more languages for the test document in the document information data store.

14. The system of claim 12 wherein the n-grams are bigrams.

15. The system of claim 14 wherein the first process, when executed, generates bigram data for the test document for a preselected plurality of bigrams of interest.

16. The system of claim 12 wherein the processor is further configured to execute a fourth process that, when executed, uses the n-gram based language models to identify one or more alternative languages L that do not overlap with a given language M, and wherein the processor is further configured to execute the fourth process prior to executing the third process.

17. The system of claim 16 wherein the alternative language L is identified as not overlapping with the given language M in the event that the alternative language L and the given language M have no characters in common.

18. The system of claim 16 wherein the alternative language L is identified as not overlapping with the given language M in the event that the respective n-gram based language models for the alternative language L and the given language M have no n-grams in common.

19. The system of claim 12 wherein the second process, when executed, generates the final score by combining separately computed score components for n-grams that have greater than a default probability of occurring in the language M and for n-grams that do not have greater than a default probability of occurring in the language M.

20. A non-transitory computer readable medium on which is stored machine readable instructions that when executed by a processor implement a method of identifying one or more languages for a document, the languages being selected from a set of candidate languages, the machine readable instructions comprising code to:
for each language (M) in the set of candidate languages, define a set of non overlapping languages (N(M)), the set N(M) consisting of one or more languages (L), wherein each language L in the set N(M) does not overlap with the language M;
obtain n-gram data for a target document;
for each language M in the set of candidate languages, use the n-gram data to determine a final score $S_F(M)$ based on relative probabilities of a first hypothesis that the target document is entirely in the language M and a second hypothesis that one portion of the target document is in the language M while another portion of the target document is in a language L selected from the set N(M);
identify one or more of the candidate languages as being languages of the document based on the final scores $S_F(M)$ for different languages M; and
store information indicating the one or more languages of the document.

21. The non-transitory computer readable medium of claim 20, wherein each language L in the set N(M) for the language M has no characters in common with the language M.

22. The non-transitory computer readable medium of claim 20, wherein each language L in the set N(M) for the language M has no n-grams in common with the language M.

23. The non-transitory computer readable medium of claim 20, wherein to obtain the n-gram data for the target document, the machine readable instructions further comprises code to:
convert character data for the target document to a character coding scheme for which an n-gram based language model for each candidate language M is available.

24. The non-transitory computer readable medium of claim 20, wherein the n-grams are bigrams.

25. The non-transitory computer readable medium of claim 20, wherein to determine the final score $S_F(M)$ for one of the languages M, the machine readable instructions further comprises code to:
compute a non-default score component ($S_\epsilon(M)$) based on n-grams in the target document that have greater than a default probability of occurring in the language M;
compute a default score component ($S_\delta(M)$) based on n-grams in the target document that do not have greater than the default probability of occurring in the language M;
compute an alternative-language score component ($S_M'(L)$) for each language L in the set N(M), the alternative-language score component being based on the n-grams in the target document that do not have greater than the default probability of occurring in the language M; and
determine the final score $S_F(M)$ based on the non-default score component $S_\epsilon(M)$ and one or both of the default score component $S_\delta(M)$ or one of the alternative-language score components $S_M'(L)$.

26. The non-transitory computer readable medium of claim 25, wherein the n-grams are bigrams and the non default score component $S_\epsilon(M)$ for the language M is given by:

$$S_\mathcal{E}(M) = \log\left[\frac{1}{P_M(c_0)}\right] + \sum_{B=non-default(M)} w_B * \log\left[\frac{1}{P_M(B)}\right],$$

wherein $c_0$ represents a first character in the document, wherein $P_M(c_0)$ is a probability of the character $c_0$ occurring in the language M, wherein the sum is over the bigrams B in the target document that have greater than the default probability of occurring in the language M, wherein $w_B$ is proportional to the number of occurrences of the bigram B in the target document, and wherein $P_M(B)$ is the probability of the bigram B occurring in the language M.

27. The non-transitory computer readable medium of claim 26, wherein the default score component $S_\delta(M)$ for the language M is given by:

$$S_\delta(M) = \sum_{B=default(M)} w_B * \log\left[\frac{1}{P_M(B)}\right],$$

wherein the sum is over the bigrams B in the target document that do not have greater than the default probability of occurring in language M and wherein $w_B$ is proportional to the number of occurrences of the bigram B in the target document.

28. The non-transitory computer readable medium of claim 27, wherein the alternative language score $S_M'(L)$ for each language L in the set N(M) is given by:

$$S_M'(L) = \sum_{B=default(M)} w_B * \log\left[\frac{1}{P_L(B)}\right],$$

wherein the sum is over the bigrams B in the target document that do not have greater than the default probability of occurring in the language M, wherein $w_B$ is proportional to the number of occurrences of the bigram B in the target document, and wherein $P_L(B)$ is the probability of the bigram B occurring in the language L.

29. The non-transitory computer readable medium of claim 25, wherein to determine the final score $S_F(M)$, the machine readable instructions further comprises code to:
determine whether a frequency of occurrence in the target document of bigrams having no greater than the default probability of occurrence in the language M exceeds a threshold;
in the event that the frequency exceeds the threshold, compute the final score $S_F(M)$ using the non default score component $S_\epsilon(M)$ and the default score component $S_\delta(M)$; and
in the event that the frequency does not exceed the threshold, computing the final score $S_F(M)$ using the non default score component $S_\epsilon(M)$ and the best one of the alternative language score components $S_M'(L)$.

30. The non-transitory computer readable medium of claim 29, wherein to identify one or more languages for the target document, the machine readable instructions further comprises code to:

identify a language $M_0$ from the set of candidate languages as having the best final score $S_F(M)$;

identify the language $M_0$ as a first language of the target document;

determine whether the final score $S_F(M_0)$ for language $M_0$ includes a contribution from an alternative-language score component for a language $L_0$; and in the event that the final score $S_F(M_0)$ for language $M_0$ includes a contribution from an alternative-language score component for a language $L_0$, identify the language $L_0$ as a second language of the target document.

* * * * *